No. 739,740. PATENTED SEPT. 22, 1903.
J. W. SUTTON.
SPEED INDICATOR FOR AUTOMOBILES.
APPLICATION FILED JUNE 20, 1902.
NO MODEL. 2 SHEETS—SHEET 1.
Fig: 1.
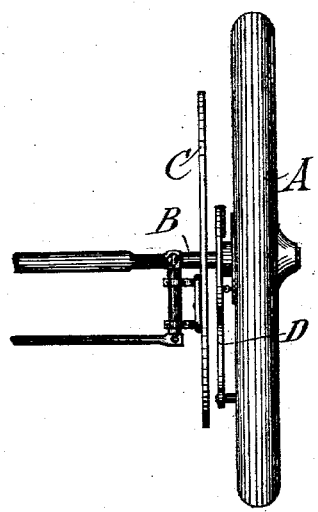
Fig: 2.
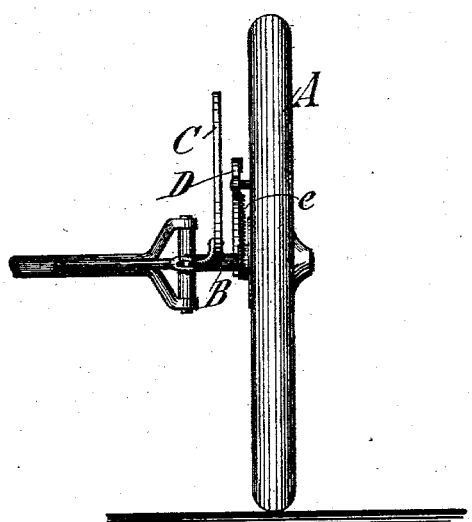
Fig: 3.
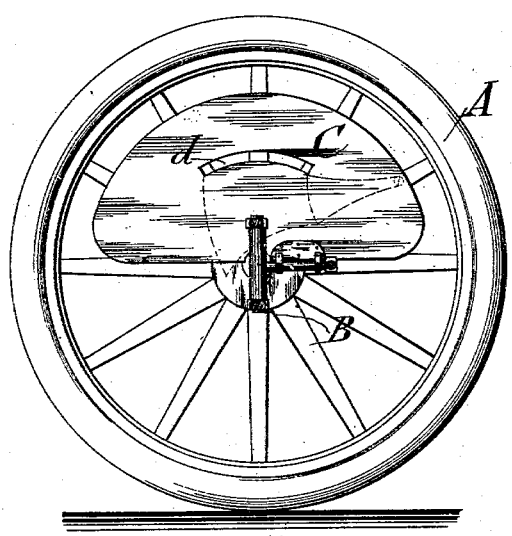
Fig: 4.
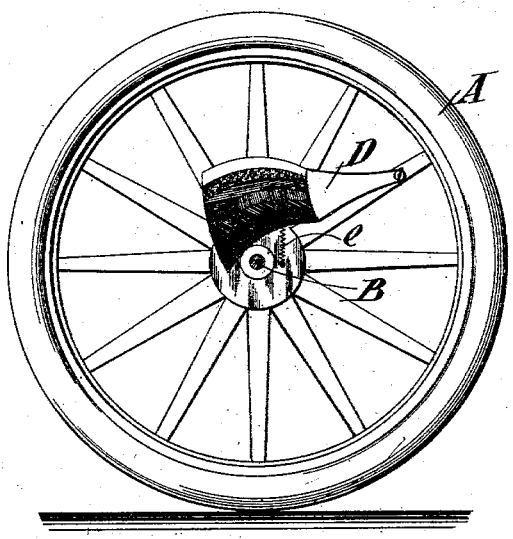
WITNESSES:
Glenn H. Niles
C. Bradway
INVENTOR
John W. Sutton
BY
Goemer Niles
ATTORNEYS.

No. 739,740. PATENTED SEPT. 22, 1903.
J. W. SUTTON.
SPEED INDICATOR FOR AUTOMOBILES.
APPLICATION FILED JUNE 20, 1902.
NO MODEL. 2 SHEETS—SHEET 2.
Fig. 5.
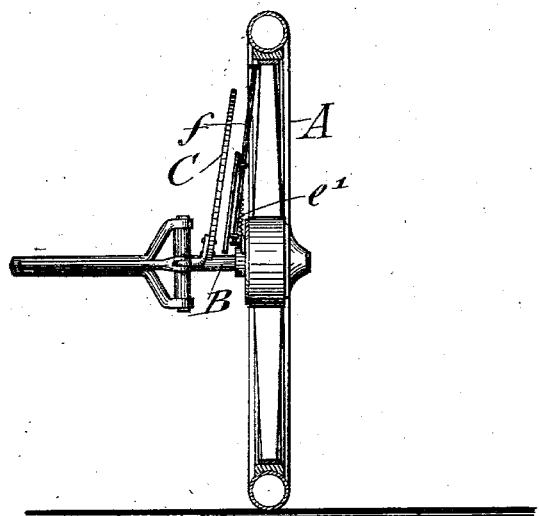
Fig. 6.
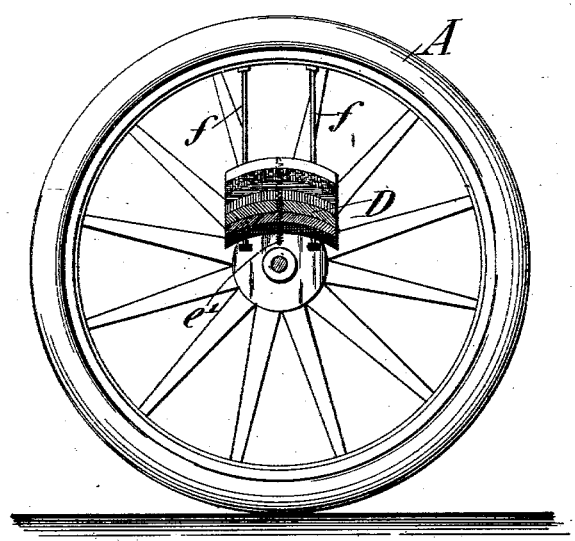
Fig. 7.
WITNESSES:
Glenn H. Niles.
C. Bradway.
INVENTOR
John W. Sutton
BY
ATTORNEYS.

No. 739,740. Patented September 22, 1903.

UNITED STATES PATENT OFFICE.

JOHN W. SUTTON, OF BROOKLYN, NEW YORK.

SPEED-INDICATOR FOR AUTOMOBILES.

SPECIFICATION forming part of Letters Patent No. 739,740, dated September 22, 1903.

Application filed June 20, 1902. Serial No. 112,451. (No model.)

*To all whom it may concern:*

Be it known that I, JOHN W. SUTTON, a citizen of the United States, residing in New York, borough of Brooklyn, and State of New York, have invented certain new and useful Improvements in Speed-Indicators for Automobiles, of which the following is a specification.

The object of this invention is to furnish to vehicles known as "automobiles" an improved speed-indicating device that will show at any time to the automobilist at what speed his machine is running, so as to enable him to keep within the legal limits of speed and have some definite measure of controlling speed; and for this purpose the invention consists of a speed-indicating attachment for automobiles which comprises a guard-plate attached to the steering-knuckle and provided with a segmental slot, a suitably-guided plate subdivided into panels or fields of different colors, and a connecting-spring between said plate and the wheel, so as to act in opposition to the centrifugal force imparted to the plate by the wheel, said indicator-plate being so arranged that it can be readily seen through the segmental slot of the guard-plate by the party controlling the motor, as will be fully described hereinafter and finally pointed out in the claims.

In the accompanying drawings, Figure 1 is a plan of the right-hand front wheel of an automobile and its steering mechanism. Fig. 2 is a rear elevation of the same. Figs. 3 and 4 are side elevations of the front wheel with my improved speed-indicating attachment, Fig. 3 showing the guard-plate in position, while in Fig. 4 the guard-plate is removed. Fig. 5 is a central vertical section of the right-hand front steering-wheel of an automobile with a modified construction of the speed-indicator. Fig. 6 is an inside elevation of the same, partly in section, and with the guard-plate removed; and Fig. 7 is a diagram of the guard attached to the automobile for indicating the speed in miles, as indicated by the speed-indicating device.

Similar letters of reference indicate corresponding parts.

Referring to the drawings, A represents the right-hand front steering-wheel of an automobile of any approved construction; B, the axle of the same, which is connected with the main axle and with the well-known steering mechanism. To the axle B is attached a segmental guard-plate C, which is provided with a segmental slot $d$. The lower edge of the segmental slot $d$ is in line with the upper outline of a speed-indicating plate D when the same is in normal position of rest. The speed-indicating plate D is either pivoted at its outer end to one of the spokes of the front wheel A of the vehicle, so that the body of the same is free to swing in outward direction away from the hub of the wheel by the centrifugal force imparted by the revolving wheel to the plate, and it may be connected by a helical spring $e$ with the hub of the wheel, the tension of the spring partially counteracting the centrifugal force, or it may be guided on parallel rods $f$, attached to the hub and rim of the wheel A, as shown in Figs. 5 and 6, the centrifugal force being adapted to act upon the helical spring $e'$, attached to the speed-indicating plate and to the hub, as shown in Fig. 6.

The speed-indicating plate D is divided across its face into a number of segmental sections or panels, which are painted in different colors, the curve of the panels corresponding with the curve of the segmental slot $d$ in the guard-plate or shield C, which is made of sheet metal and firmly attached to the steering-knuckle, being located parallel, or nearly so, with the front wheel and a small distance from the speed-indicating plate D. The curved colored panels on the speed-indicating plate D may be seen through the segmental slot in the guard-plate or shield as they revolve past the slot. The weight of the plate and the strength of the helical spring are so proportioned that when they are applied to a thirty-inch wheel of an automobile and the wheel is making ninety revolutions per minute the centrifugal force will cause the wide end of the plate to move outwardly under the tension of the spring, so that the white panel will at each revolution pass the slot in the guard-plate, indicating thereby the speed of eight miles an hour. When the speed is increased to one hundred and twelve rotations per minute, the centrifugal force will carry the plate outwardly until the panel which is of yellow color passes back of the curved slot and indicates thereby to the automobilist that the machine is running at the rate of ten miles an hour. The next succeeding panels are made likewise of different colors, the speed corresponding to the same in miles being indicated by figures on the plate D', as shown in detail, Fig. 7.

When the automobile is running at high speed, the quick rotation of the speed-indicating plate causes the panel showing through the slot of the guard-plate to produce a continuous impression to the eye of the color which is then passing the slot. The automobile is provided on the dashboard with a card or plate D', indicating the colors and the numbers of miles which the color represents on the speed-indicator, as shown in Fig. 7, so that the automobilist can readily read off thereby the speed of his machine. When the speed is slackened, the spring will draw back in the speed-indicating plate, the changing color in the slot indicating the reduced speed of the auto. If two narrow bands of colors are visible to the eye, it indicates that the machine is running at an intermediate speed. The speed-indicating attachment has to be in proportion to the size of the wheel. The successive arrangement of the colors is immaterial, provided that the speed-indicating diagram must correspond with the colors on the speed-indicating plate. The attachment is simple, having only one movable part, and can be readily cleaned. It indicates visually to the motorman the speed at which his machine is running and enables him to keep within the legal limits when driving within the city or permits him to determine the speed at which he is running when running at full speed.

In the case of automobiles that are provided with mud-guards the speed-indicating device would be concealed from view, so that it would necessitate the use of a mirror suitably placed to reflect the face of the segmental guard-plate, so that the color may be clearly seen in the slot without inconvenience to the motorman.

Having thus described my invention, I claim as new and desire to secure by Letters Patent—

1. A speed-indicating device for automobiles, consisting of a vertical guard-plate or shield attached to the steering-knuckle of the front wheel, said guard-plate being provided with a horizontal slot, a speed-indicating plate provided with colored panels arranged adjacent to said wheel, between the axis of the same and said slot, means for controlling the centrifugal movement of said indicating-plate, and a counteracting spring connected with the plate and wheel, substantially as set forth.

2. The combination, with the front steering-wheel of an automobile, of a vertical guard-plate or shield attached to the steering-knuckle of the same and provided with a horizontal segmental slot, a speed-indicating plate arranged adjacent to said shield between the axis of the same and said slot and between said shield and the wheel, and divided into a number of segmental and differently-colored strips or panels, means for guiding said indicating-plate on the wheel, and a spring connecting said indicating-plate with the wheel and acted upon by the centrifugal force thereof, substantially as set forth.

In testimony that I claim the foregoing as my invention I have signed my name in presence of two subscribing witnesses.

JOHN W. SUTTON.

Witnesses:
PAUL GOEPEL,
C. BRADWAY.